United States Patent [19]
Tsuchida

[11] Patent Number: 5,529,038
[45] Date of Patent: Jun. 25, 1996

[54] DIRECT INJECTED ENGINE

[75] Inventor: Naoki Tsuchida, Iwata, Japan

[73] Assignee: Yamaha Hatsudoki Kabushiki Kaisha, Iwata, Japan

[21] Appl. No.: 363,617

[22] Filed: Dec. 23, 1994

[30] Foreign Application Priority Data

Dec. 30, 1993 [JP] Japan .................................. 5-354045

[51] Int. Cl.⁶ ................................................ F02B 75/18
[52] U.S. Cl. ........................ 123/305; 123/302; 123/308; 123/310
[58] Field of Search .................. 123/295, 302, 123/305, 308, 310, 432

[56] References Cited

U.S. PATENT DOCUMENTS 3,154,059 10/1964 Witzky et al. ...................... 123/302 X
4,086,878 5/1978 Eisele et al. ........................ 123/295 X
4,203,393 5/1980 Giardini ........................... 123/143 B X
4,480,620 11/1984 Tange et al. ........................ 123/295 X
4,658,780 4/1987 Hosoi ................................. 123/432 X
4,844,025 7/1989 Sheaffer ................................ 123/310

FOREIGN PATENT DOCUMENTS

1006541 4/1952 France ................................... 123/302
615324 1/1949 United Kingdom ................... 123/302

Primary Examiner—Tony M. Argenbright
Attorney, Agent, or Firm—Knobbe, Martens, Olson & Bear

[57] ABSTRACT

A number of embodiments of multi-valve twin overhead cam internal combustion engines having direct fuel injection and spark plugs that are disposed between the camshafts and generally centrally of the combustion chamber. Various orientations are disclosed, and in all disclosed embodiments, twin spark plugs are employed.

16 Claims, 12 Drawing Sheets

DIRECT INJECTED ENGINE

BACKGROUND OF THE INVENTION

This invention relates to a direct injected internal combustion engine, and more particularly to an engine having direct cylinder injection and spark ignition.

In order to attempt to improve the efficiency of internal combustion engines, fuel injection has been proposed. Although manifold injection has a number of advantages, it is difficult to ensure the desired fuel stratification in order to permit lean burn operation as may be desirable to improve fuel economy and exhaust emission control. However, if direct cylinder injection is employed and the spark plug or spark plugs for the engine are also mounted in the cylinder head, then the placement of the various components becomes a problem. These problems are complicated or compounded when the engine is of the multi-valve type.

It is, therefore, a principal object of this invention to provide an improved engine construction having spark ignition and direct fuel injection.

When the fuel injector injects directly into the combustion chamber and is mounted in the cylinder head along with the spark plug, it is difficult to position the components so that good flame propagation can occur and also to ensure that a stoichiometric charge is present at the spark gap at the time of firing. In addition, the servicing of the components becomes a problem.

Therefore, it is a still further object of this invention to provide an improved direct injected, spark-ignited engine.

SUMMARY OF THE INVENTION

This invention is adapted to be embodied in a direct injected, spark-ignited internal combustion engine that is comprised of a cylinder block that defines a cylinder bore. A piston reciprocates in the cylinder bore, and a cylinder head is affixed to the cylinder bore and closes it to define a combustion chamber with the cylinder bore and the head of the piston. A fuel injector is mounted in the cylinder head and is disposed substantially on the axis of the cylinder bore and at an acute angle to this axis. A spark plug is also mounted in the cylinder head, with its spark gap depending generally centrally into the combustion chamber, and is also inclined at an acute angle to the cylinder bore axis.

DETAILED DESCRIPTION OF THE PREFERRED EMBODIMENTS OF THE INVENTION

Referring now in detail to the drawings, and initially to the embodiment of FIGS. 1-6, an internal combustion engine constructed in accordance with this embodiment is identified generally by the reference numeral 21 and is shown partially in the drawings. As will become apparent, the invention deals primarily with the combustion chamber, fuel injection, ignition, and induction and exhaust systems therefor, only the upper portion of the engine is depicted. The features of the invention are usable with a wide variety of conventional type internal combustion engines, and where any components of the engine 21 in either this embodiment or any other embodiment is not illustrated or not described, it may be considered to be of any conventional nature.

In the embodiment of FIGS. 1-6, the engine 21 is depicted as being of the in-line multiple cylinder type. It will become apparent to those skilled in the art, however, how the invention can be utilized with engines having other cylinder numbers or other cylinder configurations. Also, because of the nature of the invention, it will be described primarily by reference to a single cylinder, as it is believed clear to those skilled in the art how the invention may be employed with multiple cylinder engines, including engines having other configurations, as already noted.

Figures 1, 2:
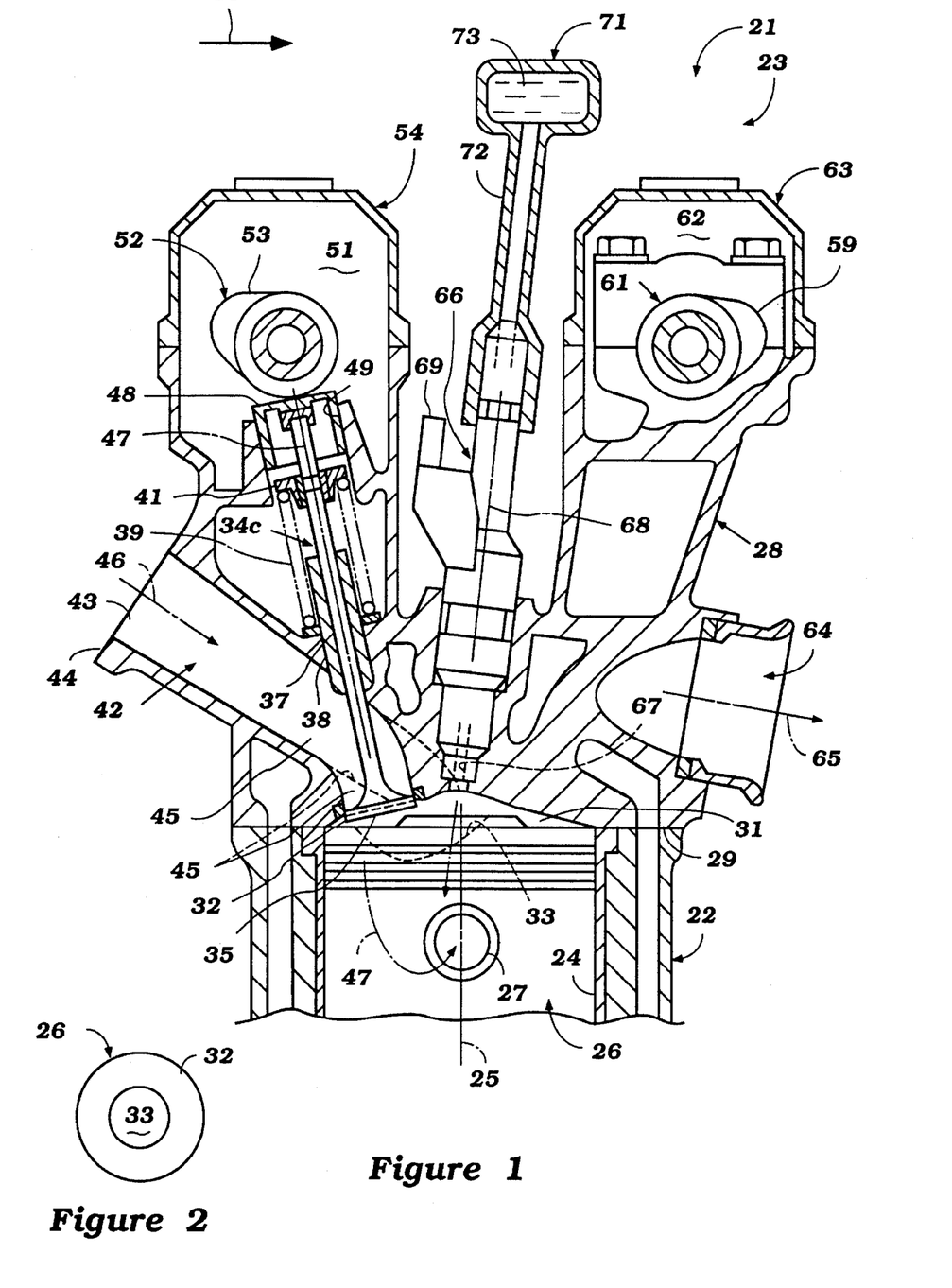
FIG. 1 is a cross-sectional view taken through a single cylinder of a multi-cylinder engine constructed in accordance with an embodiment of the invention.
FIG. 2 is a top plan view showing the head of the piston in the cylinder bore.
Figure 3:
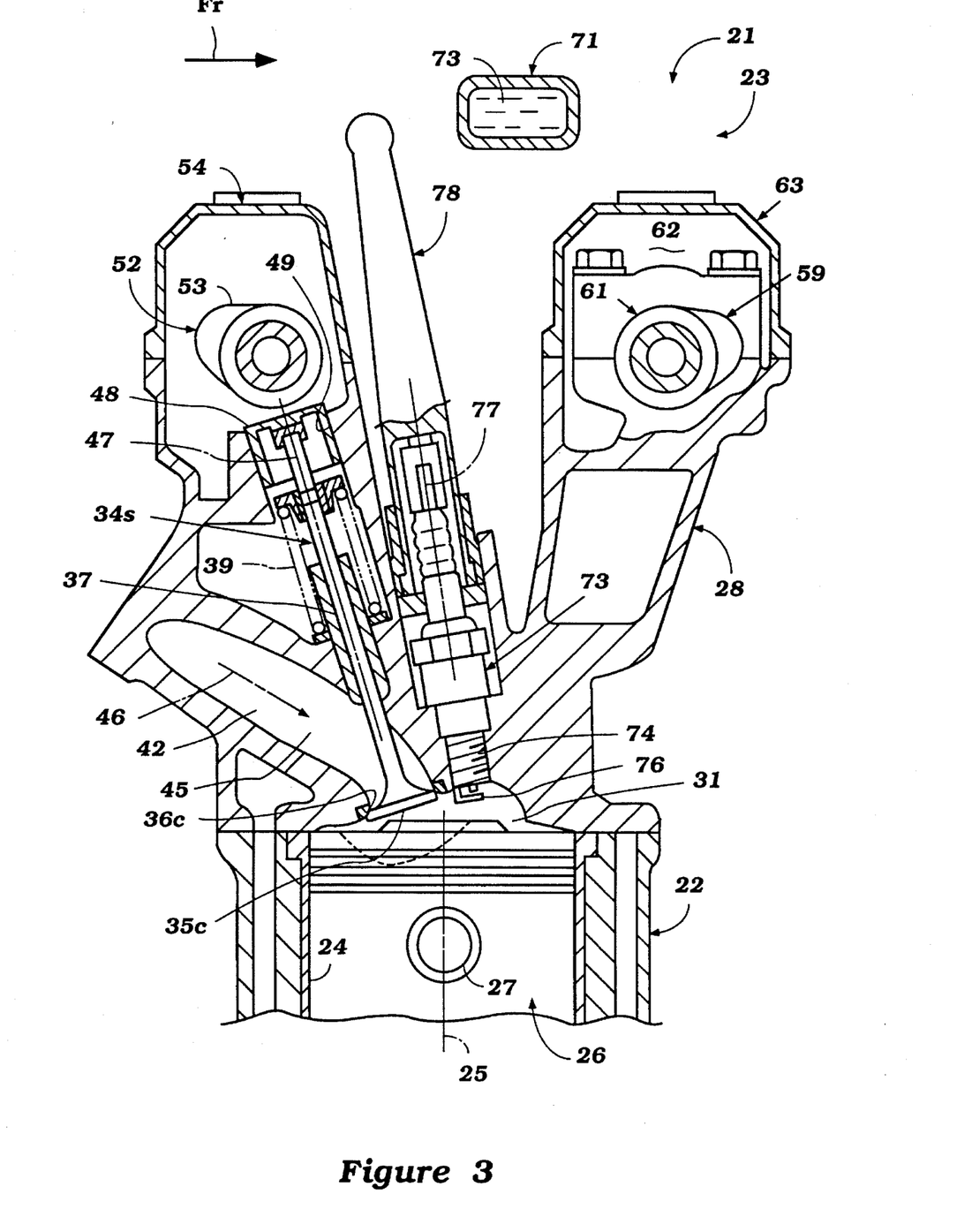
FIG. 3 is a cross-sectional view, in part similar to FIG. 1, but is taken along a plane that is offset from the plane of FIG. 1.
Figure 4:
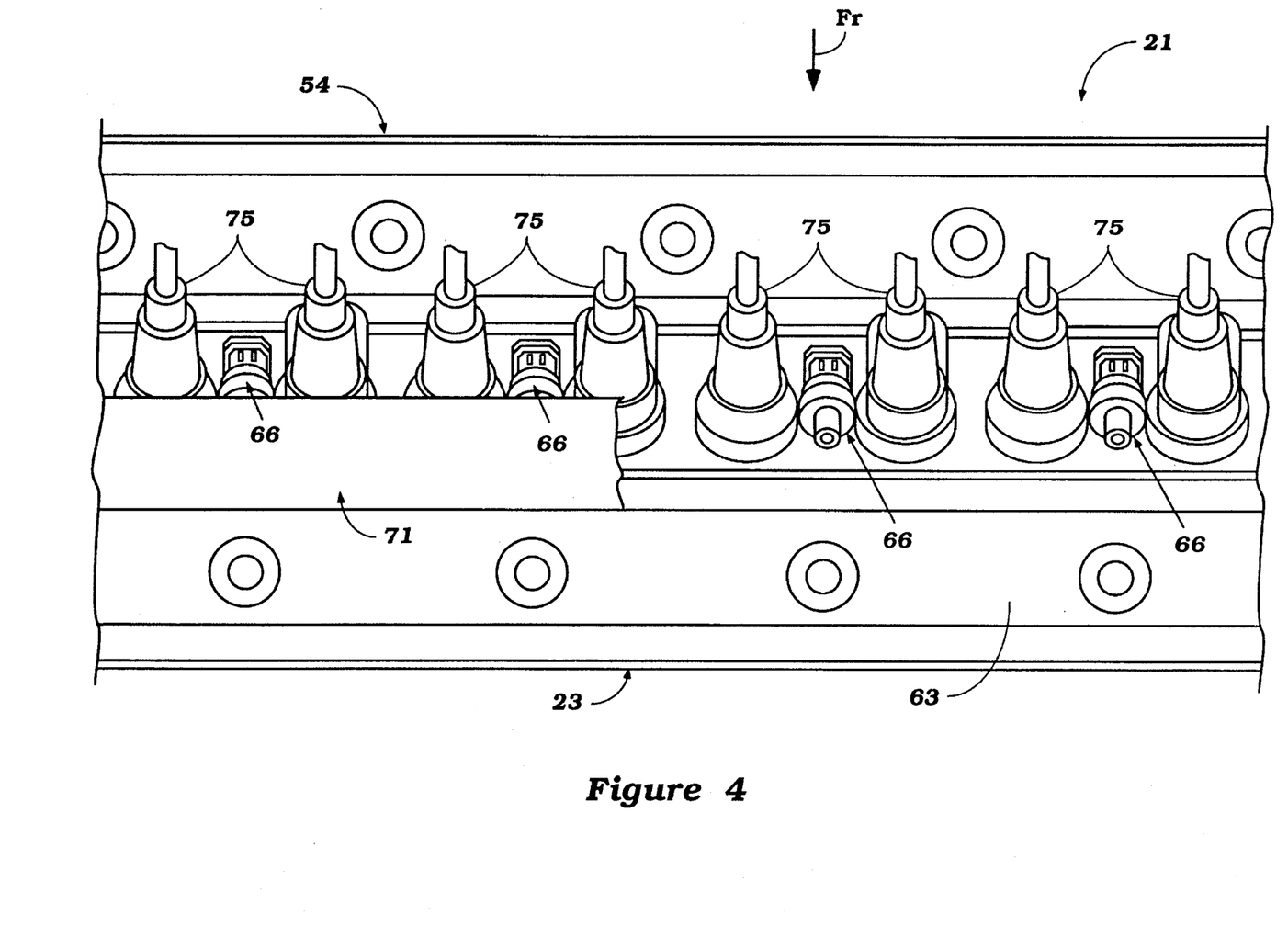
FIG. 4 is a perspective top view of the cylinder head.

The engine 21 is comprised of a cylinder block, identified generally by the reference numeral 22, to which a cylinder head assembly, identified generally by the reference numeral 23, is affixed in any well-known manner.

The cylinder block 22 is formed with one dr more cylinder bores 24 having axes 25. Pistons, identified generally by the reference numeral 26, are supported for reciprocation within the cylinder bores 24 and are connected by means of piston pins 27 to the upper or small ends of connecting rods (not shown). These connecting rods are connected to and drive a crankshaft, which is not illustrated because it may be of any conventional type.

The cylinder head assembly 23 is comprised of a main cylinder head casting 28 that has a lower surface 29 that is fixed in sealing relationship with the cylinder block 22 around each cylinder bore 24. The cylinder head surface 29 is provided with individual recesses 31 which cooperate with the cylinder bore 24 and head of the piston 26 to form combustion chambers. At times the cylinder head recesses 31 will be referred to as the combustion chamber, but as should be apparent, the combustion chamber is also formed by the other components noted.

As may be seen in FIG. 2, the piston 26 has in its head 32 a bowl or recess 33 which is offset to one side (the intake side) of the cylinder bore axis 25 for a reason which will become apparent. As will be described later other piston head configurations may be employed.

In this embodiment, the engine 21 is of the five valve per cylinder type, and this includes three intake valves, identified generally by the reference numeral 34. The intake valves 34 each includes a head portion 35 that cooperate with a respective valve seat 36 formed in the cylinder head 28 in any known manner, such as by pressed-in inserts. As may be seen in FIG. 5, one valve and valve seat, identified by the suffix "c," comprises a center intake valve, and this is disposed outwardly of a longitudinally extending plane containing the axis of the cylinder bore 25 and passing perpendicularly to the plane of FIGS. 1 and 2. The remaining valve seats and intake valves are side intake valves and are so designated by the suffix "s." These valve seats 36s are disposed so that they extend slightly over the plane containing the cylinder bore axis 25 toward the other side of the cylinder head and the aforenoted plane. However, these valve seats also lie primarily on the same side of the plane as the center valve seat 36c.

Each intake valve 34 has a stem portion 37 that is slidably supported in the cylinder head 28 by a respective valve guide 38. The reciprocal axis of the center intake valve 34c is disposed at an acute angle to the aforenoted plane. In a similar manner, the side intake valves 34s have their reciprocal axes lying in a common plane, which is also disposed at an acute angle to the aforenoted plane, but which is at a lesser acute angle to this plane. The actual orientation of the intake valves may be as described in the reissued patent entitled "Four-Cycle Engine," Re. 33,787, based upon original U.S. Pat. No. 4,660,529, issued Apr. 28, 1987, and assigned to the assignee hereof.

Each of the intake valves 34 is urged toward its closed position by means of a respective coil compression spring 39 which encircles the respective valve stem 37 and which acts against a keeper retainer assembly 41 fixed to the valve stem at a point spaced from the head 35. The opposite end of the coil compression spring 39 bears against a machined surface on the cylinder head 28.

The valve seats 36 are formed at the termination of an intake passage, identified generally by the reference numeral 42, and which extends through the cylinder head 28 from a common opening 43 in an external surface 44 thereof. A suitable induction system (not shown) is affixed to the cylinder head surface 44 in a known manner.

The intake passages 42 are of the Siamesed type and branch into individual branch sections 45, each of which terminates at a respective one of the valve seats 36. Rather than a Siamesed type of intake system, individual intake passages may be provided for each intake valve seat 36.

The air flow through the induction system flows generally unencumbered through the intake opening 43, as shown by the arrow 46 in certain of the figures. Some of this charge, and specifically that from the center intake valve seat 36, will flow generally axially downwardly to contact the piston bowl 33 and then be redirected in a tumble fashion, as shown by the arrow 47 in FIG. 1. The flow from the side intake valve seats 36 will extend axially across the combustion chamber 31 and cause some reverse tumble flow.

The valve stems 37 have extended portions 47 that extend into thimble tappets 48 that are slidably supported in the cylinder head 28 in respective bores 49. A cam tower 51 is formed in the cylinder head 28 above these tappet bores 49, and an intake camshaft 52 having cam lobes 53 is rotatably journalled therein in any well-known manner. The intake camshaft 52 is driven at one-half crankshaft speed and operates the thimble tappets 48 for opening and closing the intake valves 34 in a well-known manner. A cam cover 54 is affixed to the cylinder head 28 and closes the intake cam chamber 51.

Figure 5:
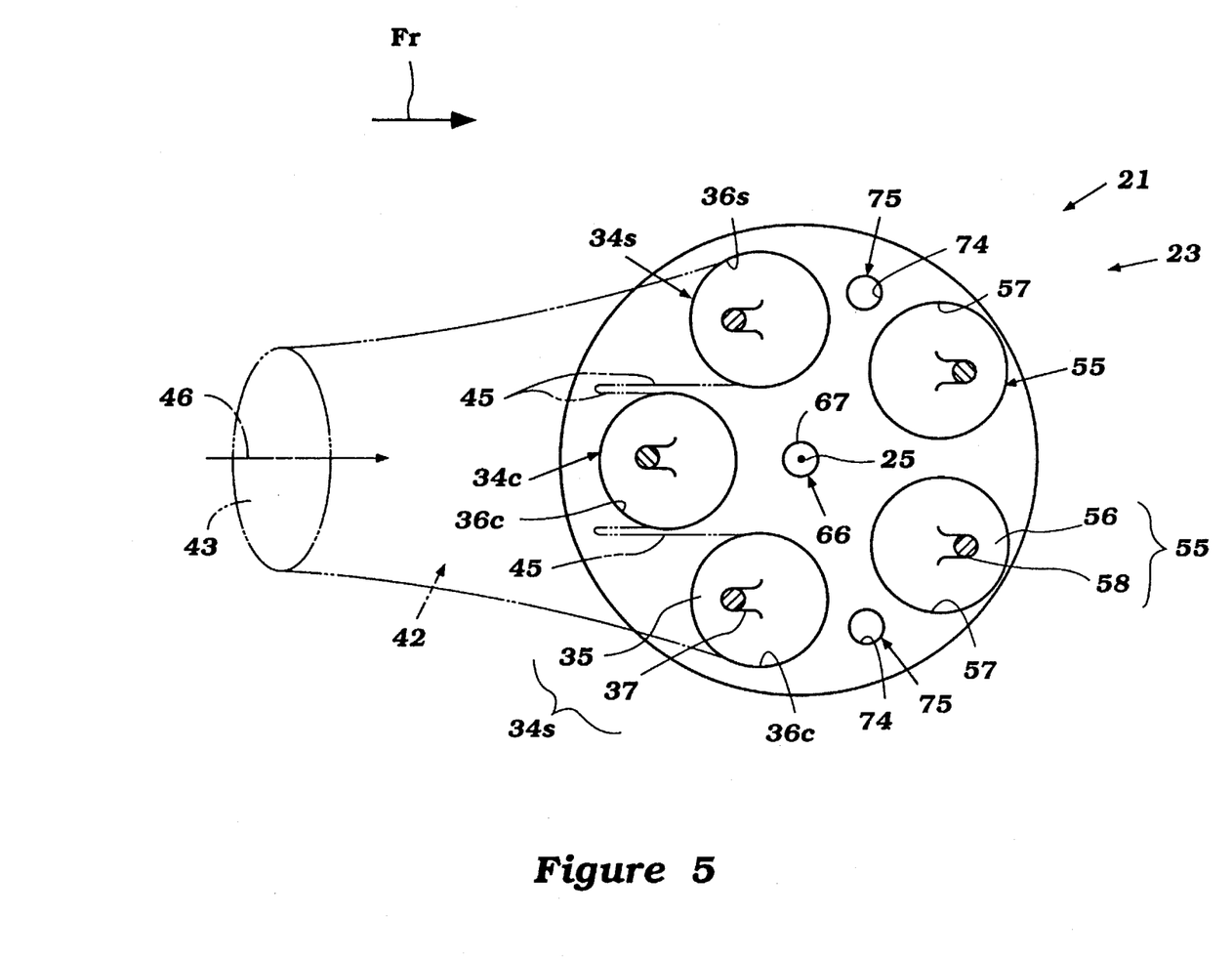
FIG. 5 is a cross-sectional view taken through a plane parallel to the plane of FIG. 3 and shows the placement of the valves, fuel injector, and spark plugs.

A pair of exhaust valves, identified generally by the reference numeral 55 and shown only in FIG. 5, are supported in the cylinder head assembly 28 on the side of the plane containing the cylinder bore axis 25 from the intake valves 34. The exhaust valves 55 have head portions 56 that cooperate with exhaust valve seats 57 and have stem portions 58 that are slidably supported within valve guides in a manner similar to the intake valves and as disclosed in the aforenoted Reissue Patent. These exhaust valves are urged by coil compression springs to closed positions and are operated by thimble tappets (not shown) which, in turn, are operated by the cam lobes 59 of an exhaust camshaft 61 formed in another cam tower 62 of the cylinder head assembly 23. The exhaust camshaft 61 is journalled for rotation in any known manner and is also driven at one-half crankshaft speed like the intake camshaft 52. The cam tower 62 is closed by a respective cam cover 63 that is affixed to the cylinder head 28 in a known manner.

An exhaust passage, shown only partially in FIG. 1 and identified by the reference numeral 64, extends from the valve seats 57 for connection to an exhaust manifold (not shown). The exhaust passage 67 may be Siamesed like the intake passage 42 or, as in alternative constructions as described, may be separate for each valve seat. The direction of flow of the exhaust gases through the exhaust passage 64 is indicated by the arrow 65 in FIG. 1. The construction of the engine 21 as thus far described may be considered to be conventional.

In accordance with a feature of the invention, a fuel injector, identified generally by the reference numeral 66, is mounted in the cylinder head 28, with its discharge nozzle 67 being disposed on the cylinder bore axis 25 (FIG. 1). The fuel injector 66 has an axis 68 which is the spray axis of the injector and which is disposed at an acute angle to the plane containing the cylinder bore axis 25 and on the exhaust side of the cylinder head.

The fuel injector 67 may be of the electrically operated type and has a terminal 69 to which a wiring harness is connected for causing fuel to be injected at the desired intervals in accordance with any type of timing routine, one of which will be described in conjunction with FIG. 6. A fuel rail 71 has individual portions 72 that are adapted to be fitted onto the ends of the fuel injector 66 for delivering fuel, indicated at 73 in FIGS. 1 and 3, to the fuel injectors 66.

A pair of tapped openings 74 are formed centrally in the cylinder head on the exhaust side thereof and transversely outwardly of the fuel injector nozzle portion 67. These tapped openings receive spark plugs, identified generally by the reference numeral 75, and which have their spark gaps 76 positioned in the combustion chamber on opposite sides of the fuel injector 66.

These spark plugs have a longitudinal axis 77 that is disposed at an acute angle to the aforenoted plane, but which is inclined on the intake side of the engine. Plug terminals 78 are affixed to the spark plugs 75 for firing them in a known manner. It should be noted that since the spark plugs have their gaps 76 disposed in somewhat facing relationship to the discharge nozzle 67 of the fuel injector 76, and since the fuel injector nozzle 66 discharges in the direction of flow of the charge from the intake passage 42 and intake valve seats 36, the fuel charge will be well dispersed toward the spark gaps 76 so as to ensure complete combustion when the plugs 75 are fired.

Figure 6:
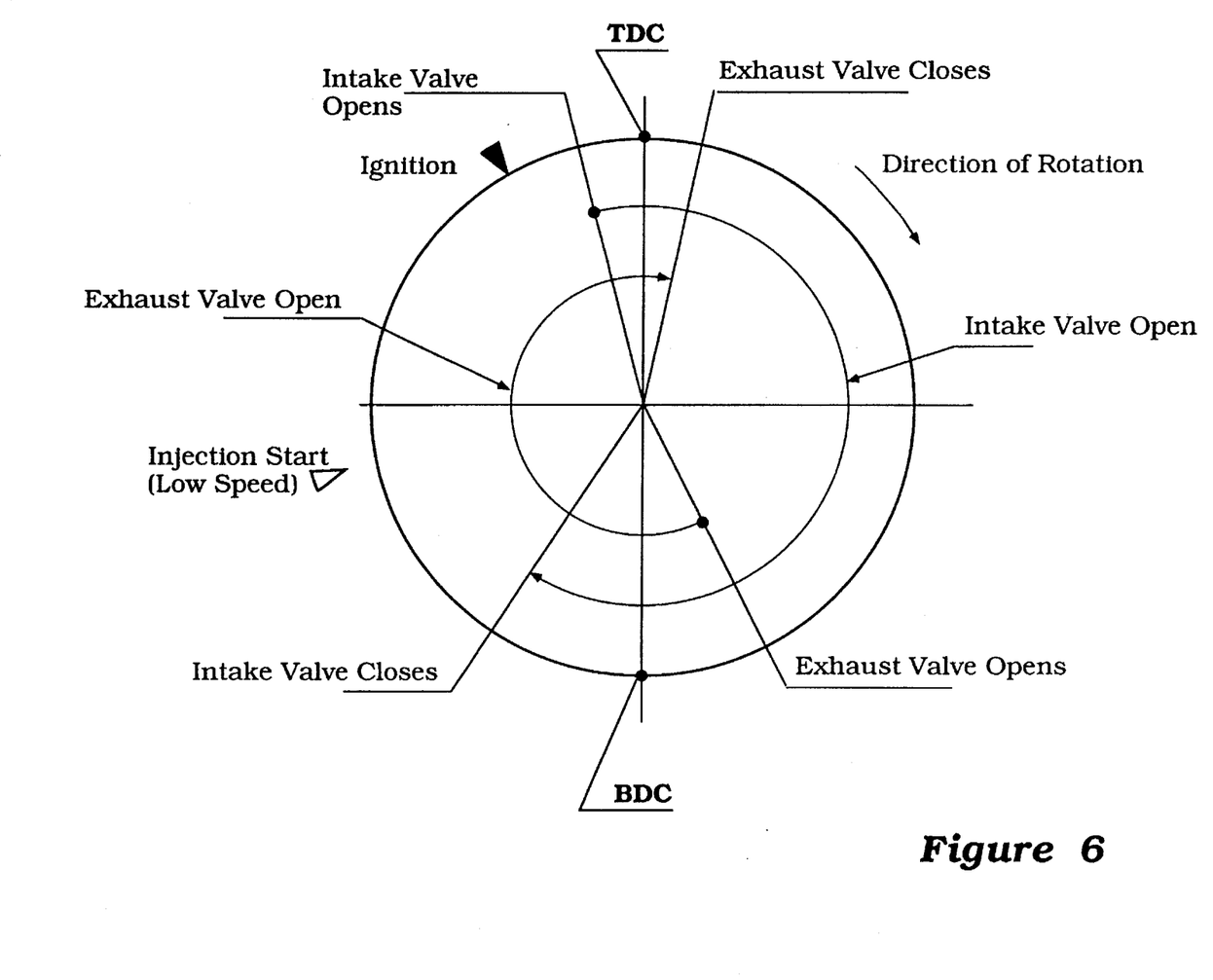
FIG. 6 is a timing diagram showing the timing events.
Figure 7:
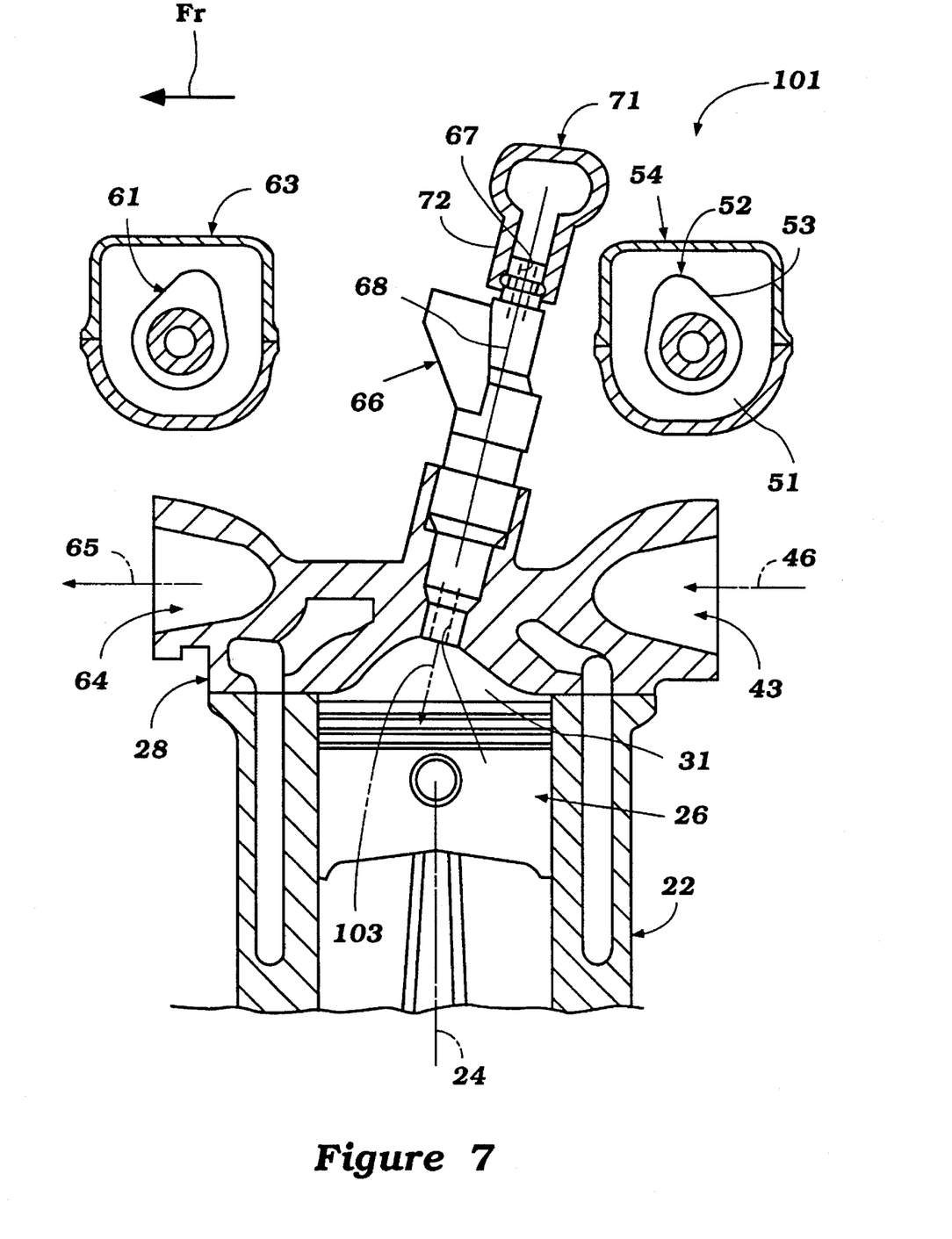
FIG. 7 is a cross-sectional view, in part similar to FIGS. 1 and 3, and shows another embodiment of the invention.
Figure 8:
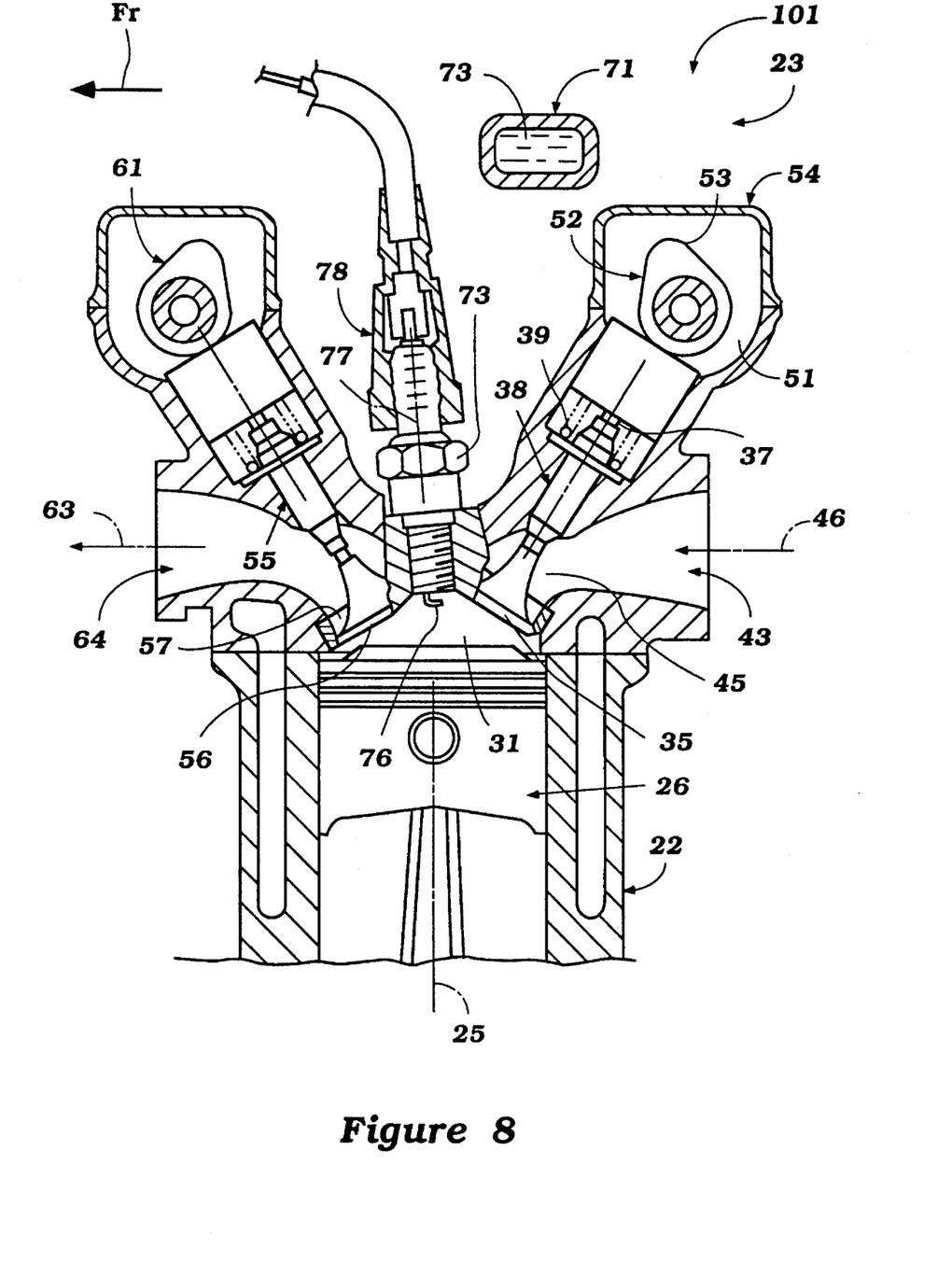
FIG. 8 is a cross-sectional view, in part similar to FIG. 7, but taken along a plane offset to that of FIG. 7.
Figure 9:
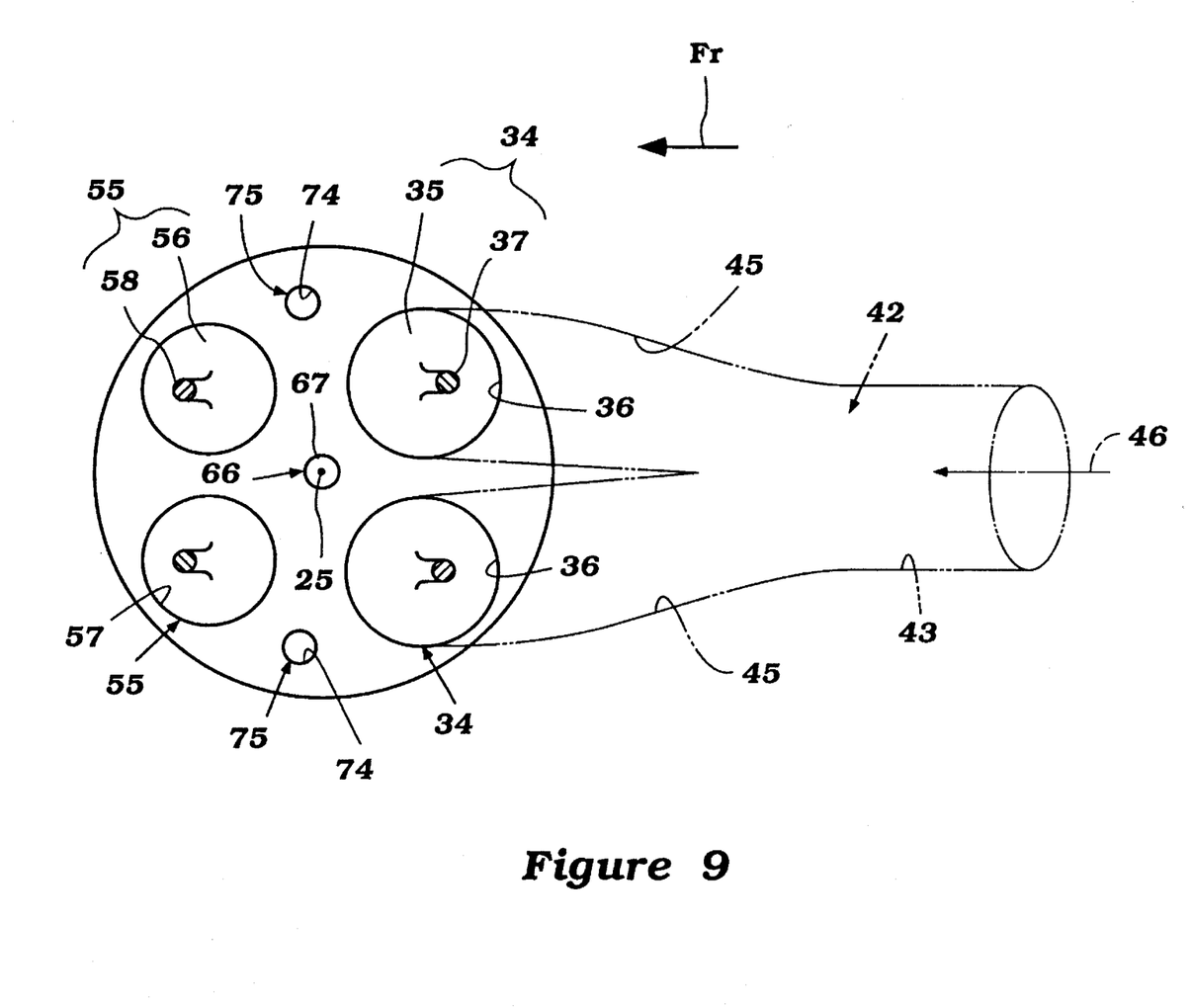
FIG. 9 is a cross-sectional view taken along a plane perpendicular to the planes of FIGS. 7 and 8 and shows the valve, fuel injector, and spark plug placement of this embodiment.
Figure 10:
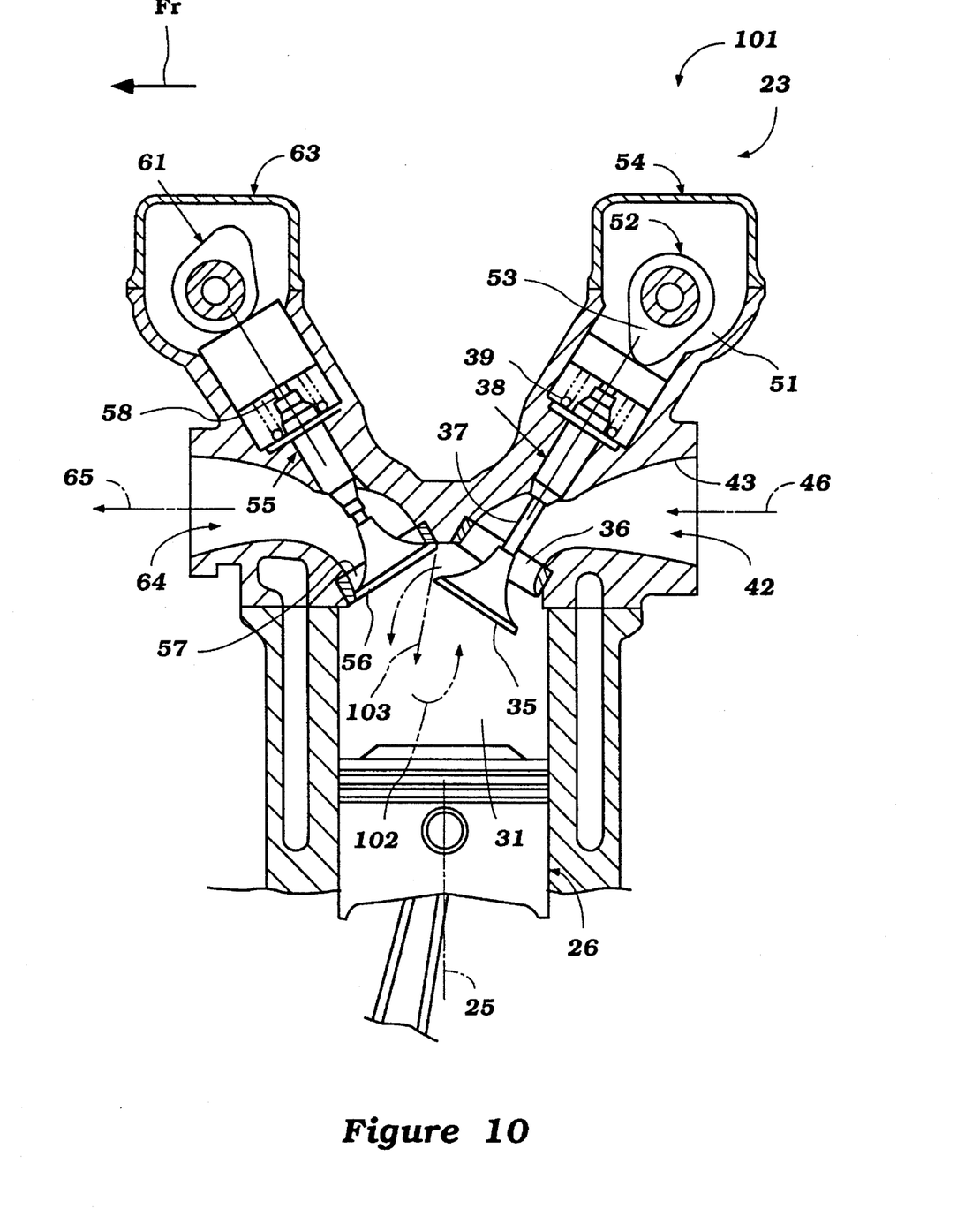
FIG. 10 is a cross sectional view, in part similar to FIG. 8, but shows the condition when the intake valves are open during the intake stroke.

FIG. 6 is a timing diagram of the events of this embodiment. The events shown are those of low-speed, low-load running, but it should be understood that only the injection and ignition timing will vary unless the engine is provided with a variable valve timing mechanism. Also, it should be understood that the timing diagram occurs over two revolutions of the crankshaft inasmuch as the engine 21 operates a four-stroke cycle principle.

The intake valves open slightly before top dead center on the suction stroke, and after the pistons 26 move below the top dead center position, the exhaust valves 55 will close. The intake valves 34 are open until slightly after bottom dead center, at which time they close. Sometime after this, the fuel injection begins, and subsequently ignition occurs before top dead center. It should be noted that both the injection timing and ignition is advanced as the load and speed increases. The charge burns and expands, and as the piston again approaches bottom dead center, the exhaust valve will open and the cycle repeats.

An engine constructed in accordance with another embodiment of the invention is shown in FIGS. 7–10 and is identified generally by the reference numeral 101. Like the previously described embodiment, the invention deals primarily with the location of the fuel injector and spark plugs and the direction of air flow through the induction and exhaust systems. Aside from this, the construction of the engine 101 may be considered to be conventional, and for that reason, the basic description of the engine will be relatively brief.

In addition, this embodiment differs from the construction of the basic engine in the embodiment of FIGS. 1–6 in that it has four valves per cylinder rather than five valves per cylinder. For that reason, components of the engine which are basically the same as that previously described have been identified by the same reference numerals and will not be described again, except insofar as is necessary to understand the construction and operation of this embodiment. Also, in this embodiment the intake and exhaust sides of the engine 101 have been reversed, but similar components have been identified by the same or similar reference numerals.

The difference in this embodiment from that previously described is that the intake passage 42, although Siamesed like the previously described embodiment, is related to the valve seats 36 so as to direct the intake flow in a positive tumble direction, as indicated by the arrows 102. In this embodiment, the fuel injector, also indicated by the same reference numeral as previously described (66), is disposed so that it is inclined to the intake rather than exhaust side of the engine.

Therefore, the injector axis 68 is inclined at an acute angle to the plane containing the cylinder bore axis 24, but is inclined on the side of the engine where the intake valves 34 are disposed. The flow path from the injector nozzle 67 therefore is as shown by the arrow 103 in FIGS. 7 and 10, and thus the air flowing into the combustion chamber 31 from the induction system, and particularly the intake passages 42, will flow with the fuel and will tend to disperse the fuel more uniformly through the combustion chamber 31.

The spark plugs, again identified by the reference numeral 73, are, like the injector 66, oppositely inclined from the preceding embodiment. That is, in this embodiment the spark plugs 73 have their axes 77 inclined on the exhaust side of the engine, but still facing the direction of fuel injection from the nozzles 66. Since the air flow in this embodiment is toward the spark plugs, it will be ensured that good mixing will result. Again, the spark plugs 73 are disposed along the same plane as the cylinder bore axis 24 and on the opposite sides of the fuel injector 66.

Figure 11:
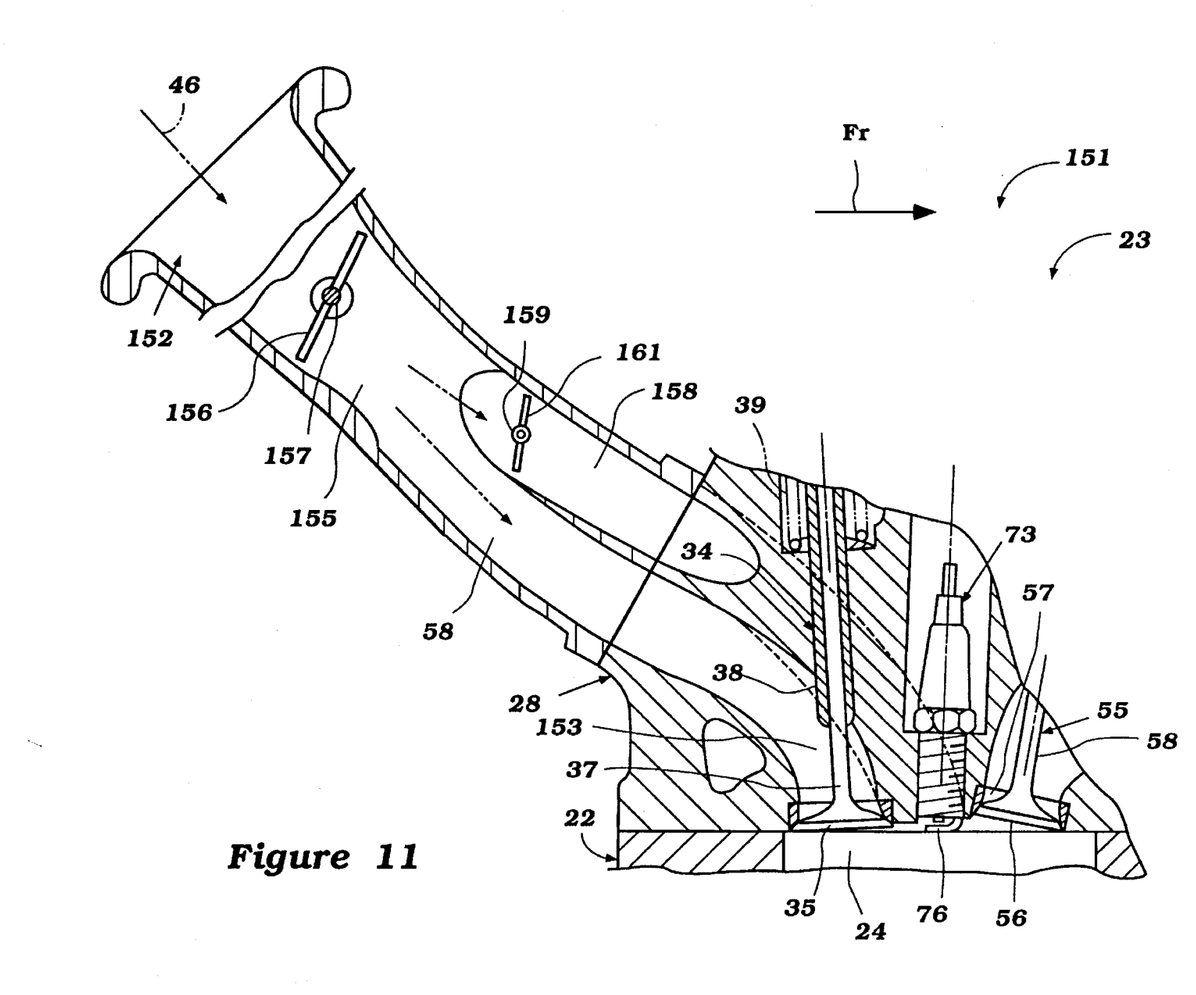
FIG. 11 is a cross-sectional view taken along the line 11-11 of FIG. 12 and shows another embodiment of the invention.
Figure 12:
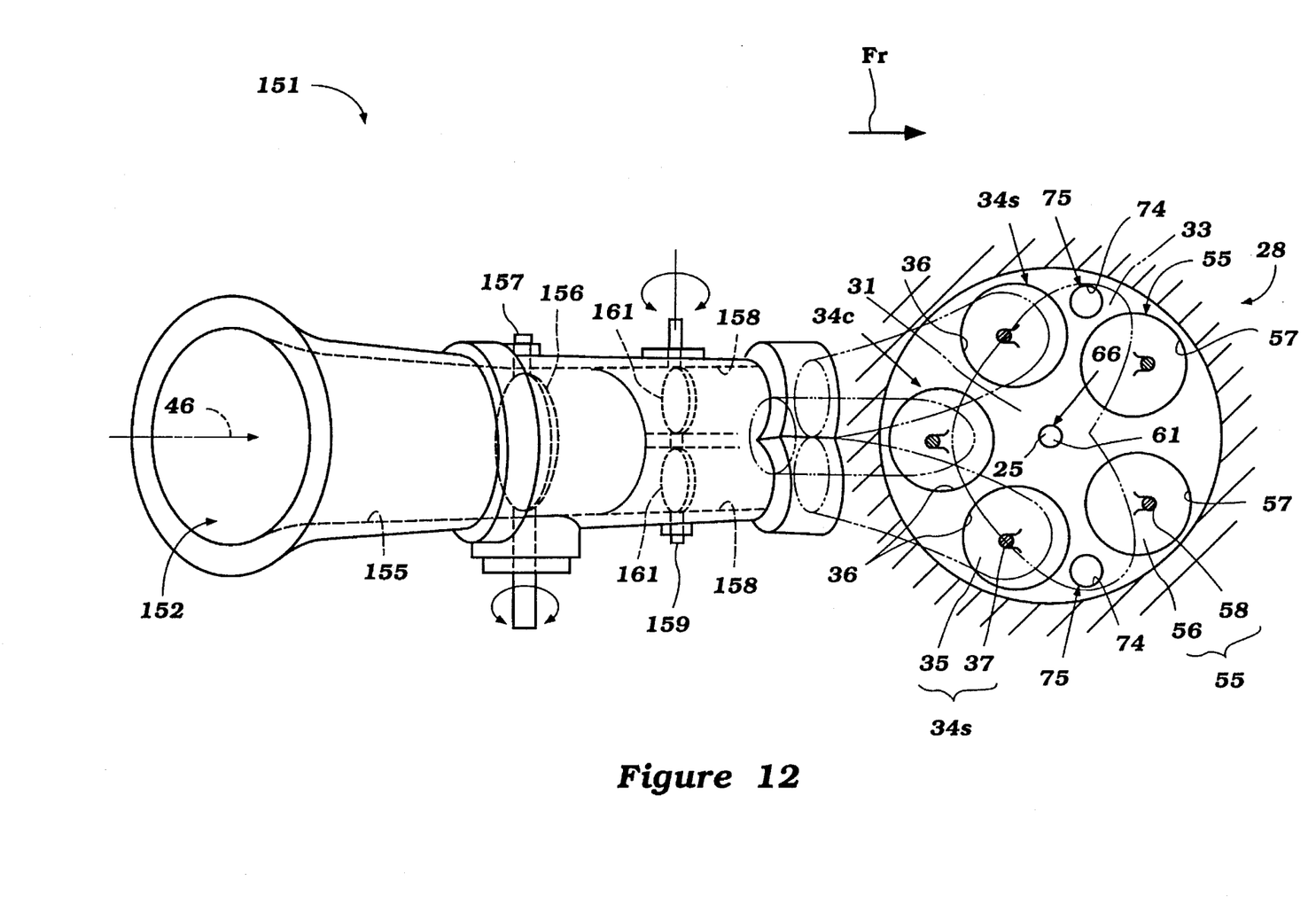
FIG. 12 is a top plan view, with a portion broken away and shown in section, illustrating the flow arrangement in this embodiment.

An engine constructed in accordance with another embodiment of the invention is shown in FIGS. 11 and 12 and is identified generally by the reference numeral 151. This embodiment is a five-valve-per-cylinder embodiment like that of FIGS. 1–6, but the spark plug and fuel injectors are inclined in opposite directions. Because of the similarities in this regard to the previously described embodiment, however, the components are identified by the same reference numerals, as it is believed that their construction and operation will be readily apparent. However, this embodiment also employs a different form of induction system, and that induction system will be identified by different reference numerals and will be described in more detail.

In this embodiment, the side intake valve seats 36s and the center intake valve seat 36c are each served by a respective induction passage. The separate induction passage formed in the cylinder head 28 and in the associated intake pipe attached thereto, which is identified generally by the reference numeral 152. The cylinder head intake passages include a center intake passage 153 and a pair of side intake passages, each identified by the reference numeral 154. The intake pipe 152 has a common inlet portion 155 in which a manually operated flow controlling throttle valve 156 is supported on a throttle valve shaft 157.

Just downstream of the throttle valve 156, the intake device 152 is divided into a first intake passage portion 158 which serves the cylinder head intake passage 153 for the center intake valve 34c. In addition, there are provided a pair of side intake passages 158, each of which cooperates with a respective one of the side cylinder head intake passages 154.

A flow controlling throttle valve shaft 159 extends transversely across the passages 158 at their inlet ends and carries a pair of butterfly-type throttle valves 161. Under low-speed, low-load conditions, the throttle valves 161 are closed, and substantially all of the charge will enter the combustion chamber through the center intake passage 153 and the center intake valve seat 36c. This charge is directed toward the fuel injector 66, and specifically its injector nozzle 67, so as to sweep the fuel across the cylinder bore 24 and cause it to reverse its flow and pass back across the gaps 76 of the spark plugs 74 at their time of firing so as to ensure good combustion. This also increases the turbulence in the combustion chamber and improves flame propagation.

As the speed and load of the engine increases and the main throttle valve 156 is opened, the throttle valves 161 are opened and this embodiment operates similar to that of the previously described embodiments.

Figure 13:
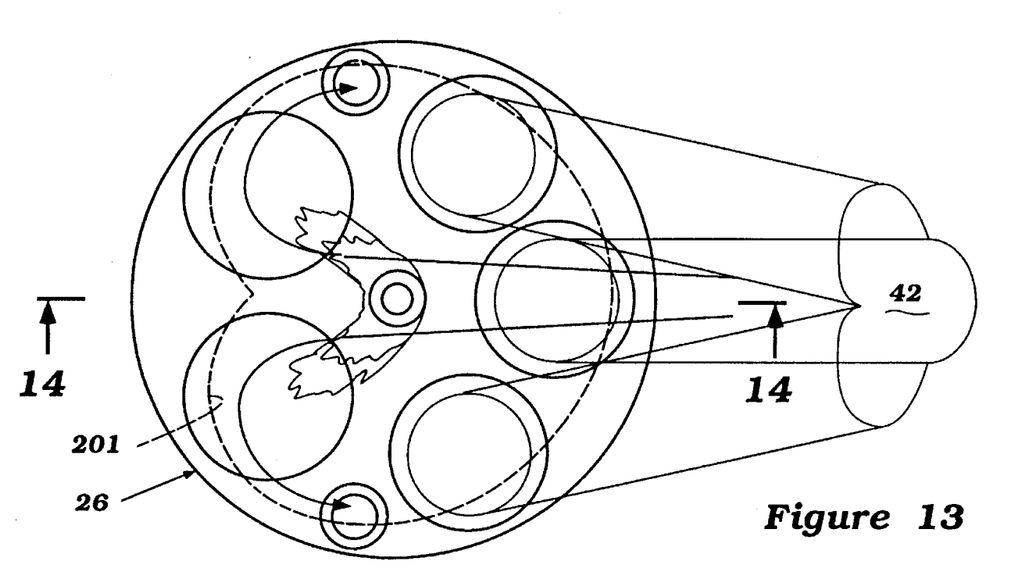
FIG. 13 is a view looking in the same general direction as FIG. 11 and shows another form of piston recess and the flame path when the charge is ignited.
Figure 14:
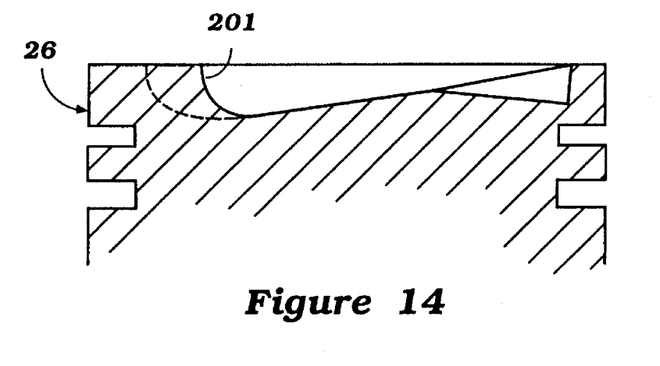
FIG. 14 is a cross-sectional view taken through the head of the piston in this embodiment.

In the five valve embodiments thus far described, the head of the piston has been provided with a bowl 33 which is somewhat spherical in configuration. FIGS. 13 and 14 show another piston configuration that is particularly useful with a five valve per cylinder engine, and it has a bowl which is heart shaped, as shown in these figures, with the bowl being identified by the reference numeral 201. This construction further ensures that the fuel spraying from the injector nozzle 67 will be well dissipated toward the spark plugs, as shown in FIG. 13.

It should be readily apparent from the foregoing description that the preferred embodiments of the invention are very effective in providing a compact cylinder head arrangement wherein the fuel injector and spark plugs are all positioned in essence between the cam towers and easily accessible. However, the flow pattern and disposition of the components are also such that it will be ensured that a stoichiometric fuel-air mixture will be present in the vicinity of the spark plugs when they are fired. Of course, the foregoing description is that of preferred embodiments of the invention, and various changes and modifications may be made without departing from the spirit and scope of the invention as defined by the appended claims.

I claim:

1. A direct injected, spark-ignited internal combustion engine comprised of a cylinder block defining a cylinder bore, a piston reciprocating in said cylinder bore, a cylinder head affixed to said cylinder block and closing said cylinder bore to define a combustion chamber with said cylinder bore and a head of said piston, a fuel injector mounted in said cylinder head and disposed substantially on the axis of said cylinder bore at an acute angle thereto, a spark plug mounted in said cylinder head with a spark gap disposed generally centrally in said combustion chamber and inclined at an acute angle to said cylinder bore axis, and an induction system for delivering a charge to the combustion chamber on one side of a plane containing said cylinder bore axis and an exhaust system for discharging the burnt charge from said combustion chamber on the other side of said plane, the flow of air from said intake passage being in opposition to the flow of fuel from the fuel injector.

2. A direct injected, spark-ignited internal combustion engine as in claim 1, wherein the axes of the spark plug and the fuel injector lie on opposite sides of a second plane containing the cylinder bore axis and perpendicular to the first mentioned plane.

3. A direct injected, spark-ignited internal combustion engine as in claim 2, wherein there are provided a pair of spark plugs in the cylinder head.

4. A direct injected, spark-ignited internal combustion engine as in claim 3, wherein the spark plugs are disposed on opposite sides of the fuel injector.

5. A direct injected, spark-ignited internal combustion engine comprised of a cylinder block defining a cylinder bore, a piston reciprocating in said cylinder bore, a cylinder head affixed to said cylinder block and closing said cylinder bore to define a combustion chamber with said cylinder bore and a head of said piston, a fuel injector mounted in said cylinder head and disposed substantially on the axis of said cylinder bore at an acute angle thereto, a spark plug mounted in said cylinder head with a spark gap disposed generally centrally in said combustion chamber and inclined at an acute angle to said cylinder bore axis, an induction system terminating at least a pair of intake valves for delivering a charge to the combustion chamber on one side of a plane containing said cylinder bore axis and an exhaust system for discharging the burnt charge from the combustion chamber on the other side of said plane.

6. A direct injected, spark-ignited internal combustion engine as in claim 5, wherein the axes of the spark plug and the fuel injector lie on opposite sides of a second plane containing the cylinder bore axis and perpendicular to the first mentioned plane.

7. A direct injected, spark-ignited internal combustion engine as in claim 6, wherein the flow of air from the intake passage is in opposition to the flow of fuel from the fuel injector.

8. A direct injected, spark-ignited internal combustion engine as in claim 7, wherein there are provided a pair of spark plugs in the cylinder head.

9. A direct injected, spark-ignited internal combustion engine as in claim 6, wherein the flow from the induction system is in the same direction as the flow from the fuel injector.

10. A direct injected, spark-ignited internal combustion engine as in claim 9, wherein there are provided a pair of spark plugs in the cylinder head.

11. A direct injected, spark-ignited internal combustion engine as in claim 5, wherein the induction system terminates at three intake valves.

12. A direct injected, spark-ignited internal combustion engine as in claim 11, wherein there are provided a pair of spark plugs in the cylinder head.

13. A direct injected, spark-ignited internal combustion engine as in claim 11, wherein the flow of air from the intake passage is in opposition to the flow of fuel from the fuel injector.

14. A direct injected, spark-ignited internal combustion engine as in claim 11, wherein the flow from the induction system is in the same direction as the flow from the fuel injector.

15. A direct injected, spark-ignited internal combustion engine as in claim 11, wherein the intake valves comprise a center intake valve disposed furthest from the plane containing the cylinder bore axis and a pair of side intake valves, each lying at least in part adjacent the plane and wherein the induction passage comprises a first portion serving the center intake valve and a second portion serving the side intake valves.

16. A direct injected, spark-ignited internal combustion engine as in claim 15, further including throttle valve means for controlling the flow through the side intake passages.

* * * * *